(12) United States Patent
Suzuki

(10) Patent No.: US 10,804,760 B2
(45) Date of Patent: Oct. 13, 2020

(54) ROTOR AND MOTOR

(71) Applicant: FANUC CORPORATION, Yamanashi (JP)

(72) Inventor: Koutarou Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 16/009,251

(22) Filed: Jun. 15, 2018

(65) Prior Publication Data

US 2019/0013709 A1     Jan. 10, 2019

(30) Foreign Application Priority Data

Jul. 7, 2017   (JP) .................................. 2017-133644

(51) Int. Cl.
| | |
|---|---|
| *H02K 3/12* | (2006.01) |
| *H02K 17/18* | (2006.01) |
| *H02K 1/26* | (2006.01) |
| *H02K 3/48* | (2006.01) |
| *H02K 7/00* | (2006.01) |

(52) U.S. Cl.
CPC .............. *H02K 3/12* (2013.01); *H02K 1/265* (2013.01); *H02K 3/48* (2013.01); *H02K 7/003* (2013.01); *H02K 17/185* (2013.01)

(58) Field of Classification Search
CPC  H02K 3/12; H02K 3/48; H02K 1/265; H02K 7/003; H02K 17/185
See application file for complete search history.

(56) References Cited

FOREIGN PATENT DOCUMENTS

| JP | S60-197141 A | | 10/1985 |
|---|---|---|---|
| JP | 07163107 A | * | 6/1995 |
| JP | H07-163107 A | | 6/1995 |
| JP | H10-004658 A | | 1/1998 |
| JP | 2009-278784 A | | 11/2009 |
| JP | 2013-236425 A | | 11/2013 |

(Continued)

OTHER PUBLICATIONS

An Office Action; "Notification of Reasons for Refusal," issued by the Japanese Patent Office dated Feb. 5, 2019, which corresponds to Japanese Patent Application No. 2017-133644 and is related to U.S. Appl. No. 16/009,251; with English language translation.

(Continued)

*Primary Examiner* — Jue Zhang
(74) *Attorney, Agent, or Firm* — Studebaker & Brackett PC

(57) ABSTRACT

A rotor includes: a cylindrical rotor core fixed to an outer peripheral side of a rotary shaft rotatable about an axis center, the rotor core including multiple first slots arranged at intervals in the peripheral direction of the rotor core and penetrating the rotor core in the axis direction of the rotary shaft, and multiple second slots formed at an inner position of the rotor core with respect to the first slots, arranged at intervals in the peripheral direction of the rotor core, and penetrating the rotor core in the axis direction of the rotary shaft; and a secondary conductor including multiple conductor bars arranged in the first slots and the second slots, and a pair of ring-like end rings arranged at opposite end surfaces of the rotor core and connecting end portions of the multiple conductor bars.

4 Claims, 5 Drawing Sheets

(56) References Cited

FOREIGN PATENT DOCUMENTS

JP      2014-128091 A    7/2014
WO      2009/093345 A1   7/2009

OTHER PUBLICATIONS

Office Action; "Notification of Reasons for Refusal," issued by the Japanese Patent Office dated Jul. 21, 2020, which corresponds to Japanese Patent Application No. 2017-133644 and is related to U.S. Appl. No. 16/009,251 with English language translation.

* cited by examiner

ROTOR AND MOTOR

This application is based on and claims the benefit of priority from Japanese Patent Application No. 2017-133644, filed on Jul. 7, 2017, the content of which is incorporated herein by reference.

BACKGROUND OF THE INVENTION

Field of the Invention

The present invention relates to a rotor and a motor including the rotor.

Related Art

A cage rotor has conventionally been known as one type of rotor in a motor. The cage rotor includes a circular cylindrical rotor core fixed to a rotary shaft, and multiple conductor bars arranged at intervals in the peripheral direction of the rotor core. The conductor bars are provided inside slots penetrating the rotor core in the axis direction of the rotor core. Further, a pair of ring-like end rings are formed independently of the rotary shaft and adjacent to the opposite end surfaces of the rotor core in the axis direction for connection (shorting) between the respective end portions of the multiple conductor bars.

When the cage rotor is in operation, a current flows through a coil of a stator provided in the motor. Then, rotating magnetic flux resulting from this current flow and an induction current generated at the conductor bars interlink to generate force which rotates the cage rotor about an axis center. The end rings integrated with the cage rotor also rotate about the axis center of the cage rotor.

The end rings are subjected to centrifugal force which is generated by the rotation of the rotor and is acting toward a radially outward direction of the rotor. Since the end rings are larger in mass than the conductor bars, larger centrifugal force act on the end rings. If the rotor rotates at a high speed, centrifugal force acting on the end rings is increased, thereby increasing stress concentrating on the opposite end portions of the conductor bar. The increased stress acts on the outer peripheral portion of the rotor core adjacent to the opposite end portions of the conductor bar. A possible action to be taken in order to rotate the rotor stably at a higher speed is to employ a configuration for reducing concentration of stress on the outer peripheral portion of the rotor core or to increase the safety factor by increasing the thickness of the outer peripheral portion of the rotor core. Among these actions, increasing the thickness of the outer peripheral portion of the rotor core affects the performance of the motor. Hence, employing a configuration for reducing concentration of stress is preferred.

According to a rotor suggested in order to reduce concentration of stress on a rotor core, substantially L-shaped holes are formed at the opposite end surfaces of the rotor core and end rings are formed to extend into the holes by casting (see patent document 1, for example). An induction motor having axially-extending holes formed at the opposite end portions of a conductor bar is also suggested (see patent document 2, for example).

Patent Document 1: Japanese Unexamined Patent Application, Publication No. 2013-236425
Patent Document 2: Japanese Unexamined Patent Application, Publication No. 2014-128091

SUMMARY OF THE INVENTION

According to the rotor described in patent document 1, the end rings are formed (casted) to extend into the substantially L-shaped holes and held, thereby preventing concentration of stress on the outer peripheral portion of the rotor core. However, with regards the casting of the end rings, it has been difficult to cast the portions which correspond to the holes into a shape conforming to the L shape. Additionally, forming the L-shaped holes at the end surfaces of the rotor core takes a great deal of effort.

According to the inductor motor described in patent document 2, the holes deform in response to stress acting on the conductor bar to reduce centrifugal force acting on the outer peripheral portion of the rotor core. However, forming the holes at the opposite end portions of the conductor bar is not easy work, and the resultant holes may affect the characteristics of the induction motor.

The present invention is intended to provide a rotor and a motor which are capable of reducing concentration of stress acting from an end ring on a rotor core, and can be produced more easily.

(1) The present invention relates to a rotor (rotor 10 described later, for example) comprising: a cylindrical rotor core (rotor core 12 described later, for example) fixed to an outer peripheral side of a rotary shaft (rotary shaft 11 described later, for example) rotatable about an axis center, the rotor core including multiple first slots (first slots 121 described later, for example) arranged at intervals in the peripheral direction (peripheral direction D2 described later, for example) of the rotor core and penetrating the rotor core in the axis direction (axis direction D1 described later, for example) of the rotary shaft, and multiple second slots (second slots 122 described later, for example) formed at an inner position of the rotor core with respect to the first slots, arranged at intervals in the peripheral direction of the rotor core, and penetrating the rotor core in the axis direction of the rotary shaft; and a secondary conductor (secondary conductor 13 described later, for example) including multiple conductor bars (first conductor bars 131, second conductor bars 132 described later, for example) arranged in the first slots and the second slots, and a pair of ring-like end rings (end rings 133 described later, for example) arranged at opposite end surfaces of the rotor core and connecting end portions of the multiple conductor bars.

(2) In the rotor described in (1), the multiple first slots may be arranged at substantially regular intervals and may have substantially equal sectional areas, and the multiple second slots may be arranged at substantially regular intervals and may have substantially equal sectional areas.

(3) In the rotor described in (1) or (2), the first slots and the second slots may be arranged at different positions in terms of phases in the peripheral direction of the rotor core.

(4) The present invention relates to a motor (motor 1 described later, for example) comprising: the rotor described in any one of (1) to (3); and a circular cylindrical stator (stator 20 described later, for example) in which the rotor is arranged.

The rotor and the motor provided by the present invention are capable of reducing concentration of stress acting from an end ring on a rotor core, and can be produced more easily.

DETAILED DESCRIPTION OF THE INVENTION

Figure 1:
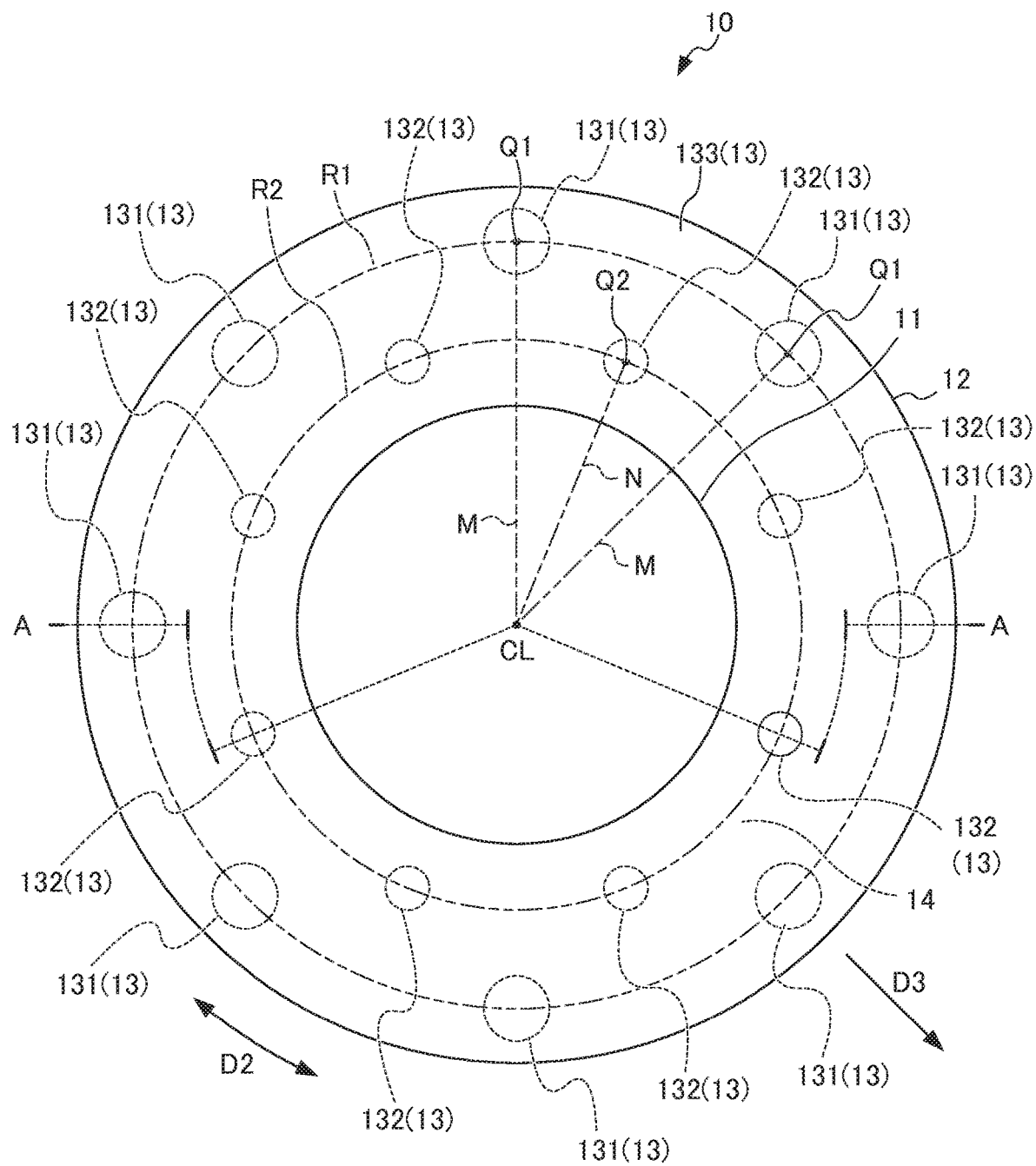
FIG. 1 is a front view showing, in outline, the configuration of a motor according to an embodiment of the present invention.
Figure 2:
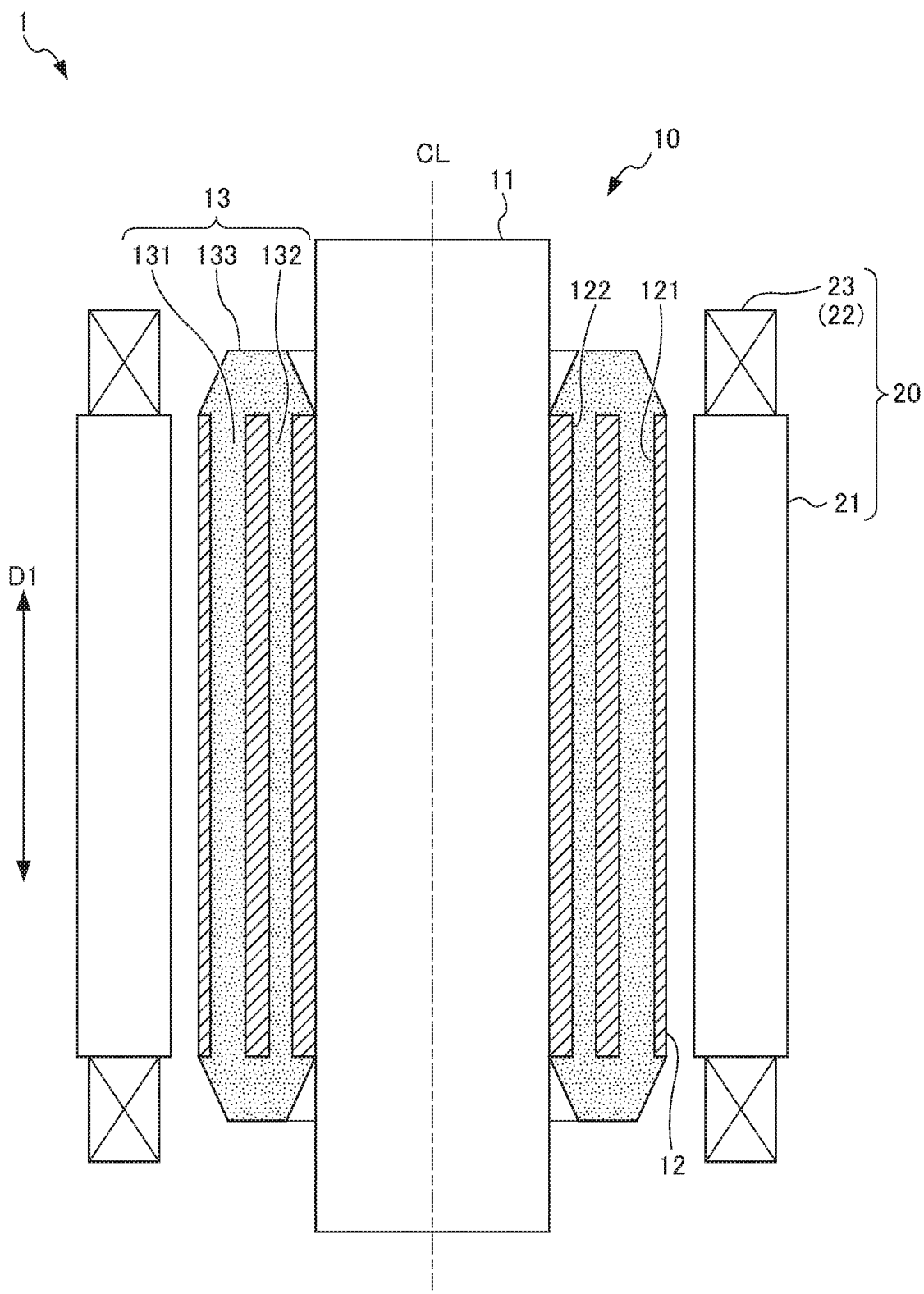
FIG. 2 is a sectional view taken along a line A-A of FIG. 1.
Figure 3:
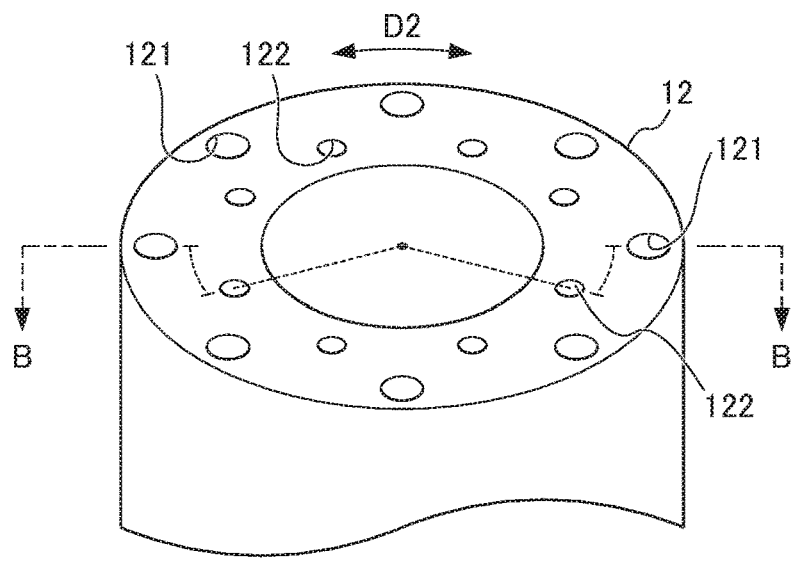
FIG. 3 is a perspective view showing, in outline, the configuration of a rotor core in the motor according to the embodiment.
Figure 4:
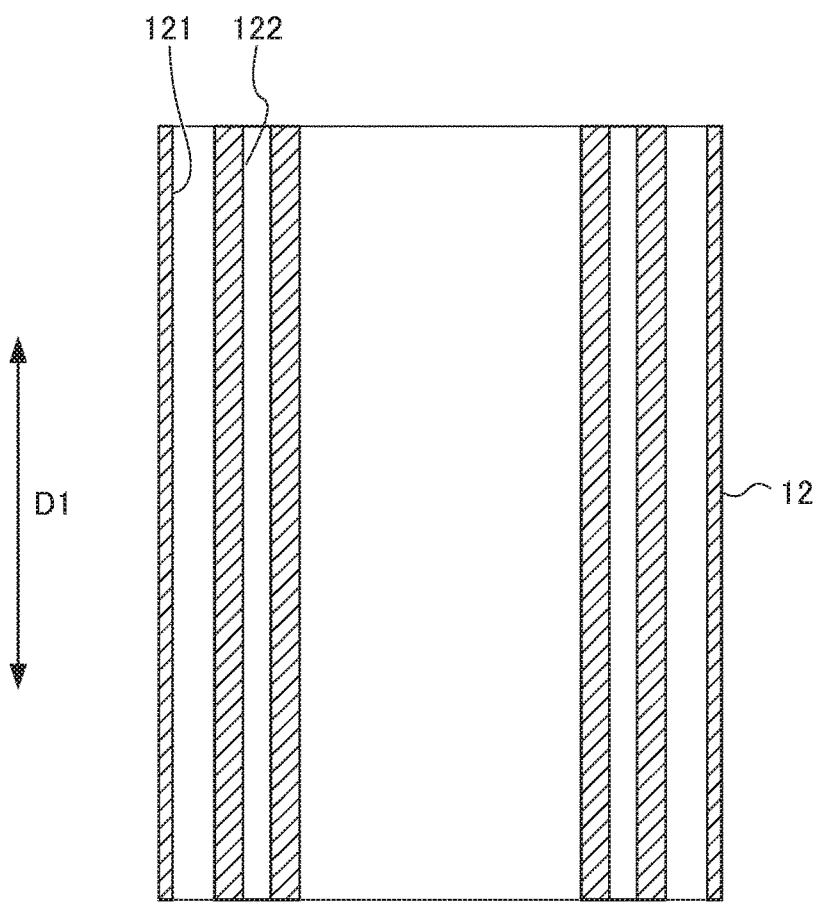
FIG. 4 is a sectional view taken along a line B-B of FIG. 3.
Figure 5:
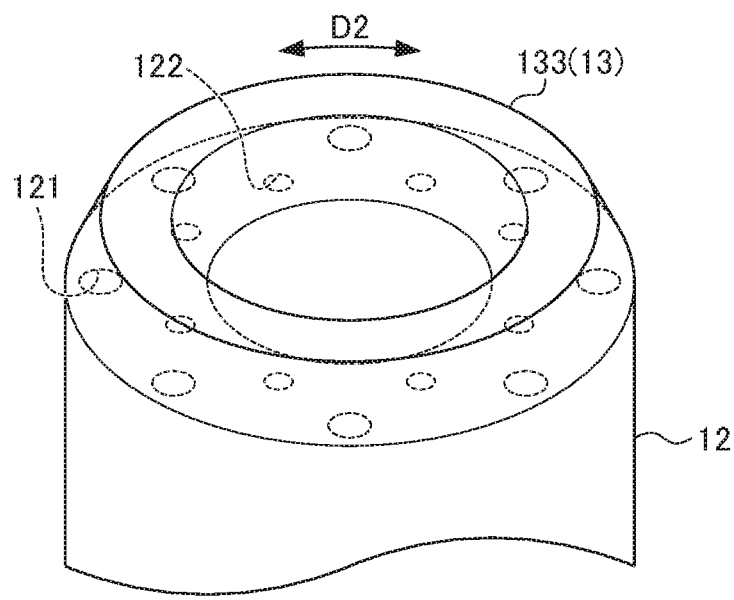
FIG. 5 is a perspective view showing, in outline, the configuration of an end ring and that of the rotor core in the motor according to the embodiment.
Figure 6:
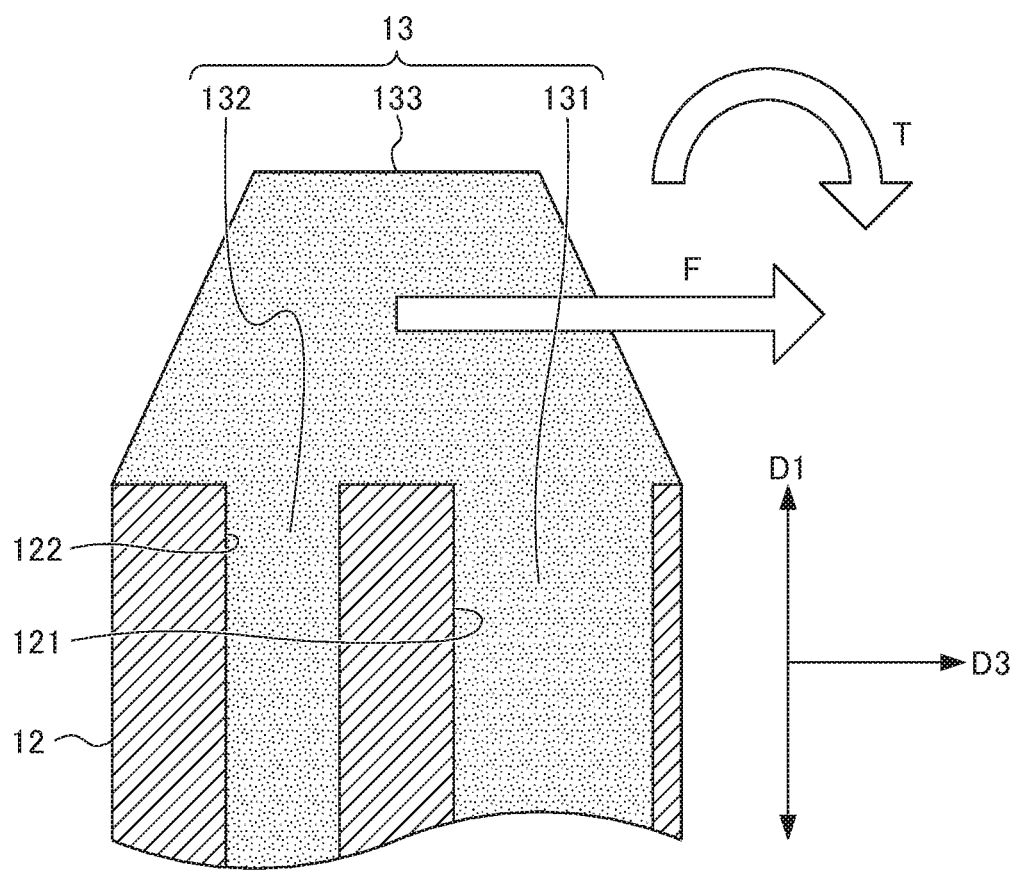
FIG. 6 is a partial sectional view showing an end portion of the rotor core in the motor in an enlarged manner according to the embodiment.

An embodiment of a rotor and a motor according to the present invention will be described below by referring to FIGS. 1 to 6. FIG. 1 is a front view showing, in outline, the configuration of a motor 1 according to the embodiment of the present invention. FIG. 2 is a sectional view taken along a line A-A of FIG. 1. FIG. 3 is a perspective view showing, in outline, the configuration of a rotor core 12 in the motor 1 according to the embodiment. FIG. 4 is a sectional view taken along a line B-B of FIG. 3. FIG. 5 is a perspective view showing, in outline, the configuration of an end ring 133 and that of the rotor core 12 in the motor 1 according to the embodiment. FIG. 6 is a partial sectional view showing an end portion of the rotor core 12 in the motor 1 in an enlarged manner according to the embodiment.

As shown in FIGS. 1 and 2, the motor 1 of this embodiment includes a rotor 10 and a stator 20. The motor 1 of this embodiment is a cage induction motor.

The rotor 10 includes a rotary shaft 11, the rotor core 12, and a secondary conductor 13. The rotary shaft 11 is a rod-like body. The rotary shaft 11 is rotatably supported by a case (not shown in the drawings) of the motor 1 through bearings (not shown in the drawings) on opposite sides of the rotary shaft 11 in an axis direction. Specifically, the rotary shaft 11 is rotatable about an axis center CL. In FIG. 2, the axis center CL of the rotary shaft 11 is indicated by an alternate long and short dashed line. In the following description, the axis direction of the rotary shaft 11 will also be simply called an "axis direction D1".

As shown in FIGS. 1 to 4, the rotor core 12 is formed into a circular cylindrical shape (cylindrical shape) by stacking ring-like (circular-disk) magnetic steel sheets in the axis direction D1. The rotor core 12 is fixed to the outer peripheral surface of the rotary shaft 11 arranged at a central portion of the rotor core 12. The rotor core 12 includes multiple first slots 121 and multiple second slots 122.

The first slots 121 are formed as through holes penetrating the rotor core 12 in the axis direction D1. More specifically, the first slots 121 are formed as through holes penetrating the rotor core 12 in the axis direction D1 from one end surface of the rotor core 12 toward an opposite end surface thereof. The first slots 121 have sectional areas substantially equal to each other. The sectional areas of the first slots 121 are not limited and are, for example, from 10 to 100 mm². The "substantially equal sectional areas" include not only sectional areas exactly equal to each other but also sectional areas considered to be equal in terms of function (this will be applied to the following description).

The multiple first slots 121 are arranged at intervals in a peripheral direction D2 of the rotor core 12. In other words, as shown in FIG. 1, the multiple first slots 121 are arranged along a virtual circle R1 centered at the axis center CL of the rotary shaft 11 (rotation center of the rotor core 12). The number of the first slots 121 is not limited. For example, 10 to 50 first slots 121 may be provided. The first slots 121 are arranged at substantially regular intervals along the virtual circle R1. The "substantially regular intervals" include not only exactly regular intervals but also intervals considered to be regular intervals in terms of function (this will be applied to the following description).

The second slots 122 are formed as through holes penetrating the rotor core 12 in the axis direction D1. More specifically, the second slots 122 are formed as through holes penetrating the rotor core 12 in the axis direction D1 from one end surface of the rotor core 12 toward an opposite end surface thereof. The second slots 122 have sectional areas substantially equal to each other and smaller than the sectional areas of the first slots 121. The sectional areas of the second slots 122 are not limited and are, for example, from 10 to 100 mm².

The multiple second slots 122 are arranged at intervals in the peripheral direction D2 of the rotor core 12. The second slots 122 are formed on an inner side with respect to the first slots 121. In other words, as shown in FIG. 1, the multiple second slots 122 are arranged along a virtual circle R2 centered at the axis center CL of the rotary shaft 11 (rotation center of the rotor core 12) and having a shorter diameter than the virtual circle R1 along which the first slots 121 are arranged. The number of the second slots 122 is not limited. For example, 10 to 50 second slots 122 may be provided. The second slots 122 are arranged at substantially regular intervals along the virtual circle R2.

In this embodiment, the first slots 121 and the second slots 122 are arranged at different positions in terms of phases in the peripheral direction D2 of the rotor core 12. More specifically, the second slot 122 (preferably, the center Q2 of the second slot 122) is arranged on a bisector N of an angle formed by a line segment M connecting the center Q1 of a first slot 121 and the axis center CL of the rotary shaft 11 and a line segment M adjacent to the former line segment M in the peripheral direction D2. Specifically, the first slot 121 and the second slot 122 are shifted by half a pitch in the peripheral direction D2.

The secondary conductor 13 is formed by casting. The secondary conductor 13 is formed, for example, using an aluminum alloy. As shown in FIGS. 1, 2, 5, and 6, the secondary conductor 13 includes multiple first conductor bars (conductor bars) 131, multiple second conductor bars (conductor bars) 132, and a pair of end rings 133.

The first conductor bars 131 are formed in the first slots 121 by casting an aluminum alloy, for example. The first conductor bars 131 are arranged at intervals in the peripheral direction D2 of the rotor core 12 and penetrate the rotor core 12 in the axis direction D1 of the rotary shaft 11. The first conductor bars 131 are arranged at substantially regular intervals in the peripheral direction D2 of the rotor core 12. The arrangement and the sectional areas of the first conductor bars 131 conform to those of the first slots 121.

The second conductor bars 132 are formed in the second slots 122 by casting an aluminum alloy, for example. The second conductor bars 132 are arranged at intervals in the peripheral direction D2 of the rotor core 12 and penetrate the rotor core 12 in the axis direction D1 of the rotary shaft 11. The second conductor bars 132 are arranged at substantially regular intervals in the peripheral direction D2 of the rotor core 12. The arrangement and the sectional areas of the second conductor bars 132 conform to those of the second slots 122.

The pair of end rings (shorting rings) 133 have ring-like shapes and are formed by casting to be integral with the first conductor bars 131 and the second conductor bars 132. The pair of end rings 133 are arranged adjacent to corresponding ones of the opposite end surfaces of the rotor core 12 to connect the end portions of the first conductor bars 131 and those of the second conductor bars 132. Specifically, each of the end rings 133 forming a pair is arranged adjacent to the end surface of the rotor core 12 so as to cover this end surface of the rotor core 12.

More specifically, at one end surface side of the rotor core 12, the respective end portions on one side of the multiple first conductor bars 131 and the respective end portions on one side of the multiple second conductor bars 132 are mechanically and electrically connected by the end ring 133 on one side. Likewise, at an opposite end surface side of the rotor core 12, the respective end portions on the opposite side of the multiple first conductor bars 131 and the respective end portions on the opposite side of the multiple second conductor bars 132 are mechanically and electrically connected by the end ring 133 on the opposite side.

The stator 20 is fixed to the case of the motor 1 (not shown in the drawings). The stator 20 includes a stator core 21 and a coil 22.

The stator core 21 is formed into a substantially circular cylindrical shape. The stator core 21 is formed by stacking multiple magnetic steel sheets in the axis direction D1.

The coil 22 is wound around the stator core 21. The coil 22 is formed, for example, by using three-phase coils 22 including a U-phase coil, a V-phase coil, and a W-phase coil. With regards to each of the coils 22, the portions that protrude to the opposite sides of the stator core 21 in the axis direction D1 function as coil ends 23.

The motor 1 described above functions as follows. First, a current flows through the coil 22 of the stator 20 to generate rotating magnetic flux. Further, an induction current is generated at the first conductor bars 131 and the second conductor bars 132. The rotating magnetic flux and the induction current interlink to rotate the rotary shaft 11, the rotor core 12, and the secondary conductor 13 about the axis center of the rotary shaft 11.

As a result of the rotation of the rotor core 12 and the secondary conductor 13, centrifugal force F and moment T act on the rotor core 12 and the secondary conductor 13. In particular, the centrifugal force F and the moment T acting on the end rings 133 generate force acting on the end rings 133 to cause deformation in a radially outward direction D3.

Meanwhile, not only the first conductor bars 131 but also the second conductor bars 132 are formed integrally with the end rings 133. This causes the first conductor bars 131 and the second conductor bars 132 to support the end rings 133. This functions to distribute (reduce) the centrifugal force F and the moment T acting on the end rings 133, specifically those transmitted through the first conductor bars 131 and the second conductor bars 132 to act on the outer peripheral portion of the rotor core 12. As a result, even if the rotor 10 is in a severe environment where it rotates at a high speed, the rotor 10 can still be used stably.

The rotor 10 and the motor 1 of this embodiment achieve the following effects, for example. The rotor 10 of this embodiment includes: the cylindrical rotor core 12 fixed to an outer peripheral side of the rotary shaft 11 rotatable about an axis center, the rotor core 12 including the multiple first slots 121 arranged at intervals in the peripheral direction D2 of the rotor core 12 and penetrating the rotor core 12 in the axis direction D1 of the rotary shaft 11, and the multiple second slots 122 formed at an inner position of the rotor core 12 with respect to the first slots 121, arranged at intervals in the peripheral direction D2 of the rotor core 12, and penetrating the rotor core 12 in the axis direction D1 of the rotary shaft 11; and the secondary conductor 13 including the multiple first conductor bars 131 and the multiple second conductor bars 132 arranged in the first slots 121 and the second slots 122 respectively, and the pair of ring-like end rings 133 arranged at opposite end surfaces of the rotor core 12 and connecting end portions of the multiple first conductor bars 131 and end portions of the multiple second conductor bars 132.

Thus, even if rotation of the rotary shaft 11 generates centrifugal force and moment acting on the end rings 133, the end rings 133 are still supported by the first conductor bars 131 and the second conductor bars 132. In this way, the centrifugal force and the moment on the end rings 133 act only partially on the first conductor bars 131 and the second conductor bars 132, making it possible to reduce concentration of stress on the outer peripheral portion of the rotor core 12. Moreover, concentration of stress can be reduced simply by the provision of the first slots 121 and the second slots 122 at the rotor core 12. Therefore, the rotor 10 can be manufactured more easily.

The multiple first slots 121 are arranged at substantially regular intervals and have substantially equal sectional areas. The multiple second slots 122 are arranged at substantially regular intervals and have substantially equal sectional areas. This allows uniform distribution of the centrifugal force F and the moment T acting on the first conductor bars 131 and the second conductor bars 132 in the first slots 121 and the second slots 122 respectively. As a result, the rotor 10 can be used under a more severe condition.

The first slots 121 and the second slots 122 are arranged at different positions in terms of phases in the peripheral direction D2 of the rotor core 12. If the first slot 121 and the second slot 122 are close to each other, the first slot 121 and the second slot 122 block each other's magnetic paths, thereby adversely affecting the performance of the motor. By contrast, in this embodiment, the interval between the first slot 121 and the second slot 122 adjacent to each other is increased. Thus, adverse effects on the motor can be minimized.

A motor 2 according to a different embodiment will be described next by referring to FIG. 7. In the description of the motor 2, structures common to that of the motor 1 will be given the same sign and will not be described. In addition, in the description of the motor 2, effects comparable to that achieved by the motor 1 will not be described.

Figure 7:
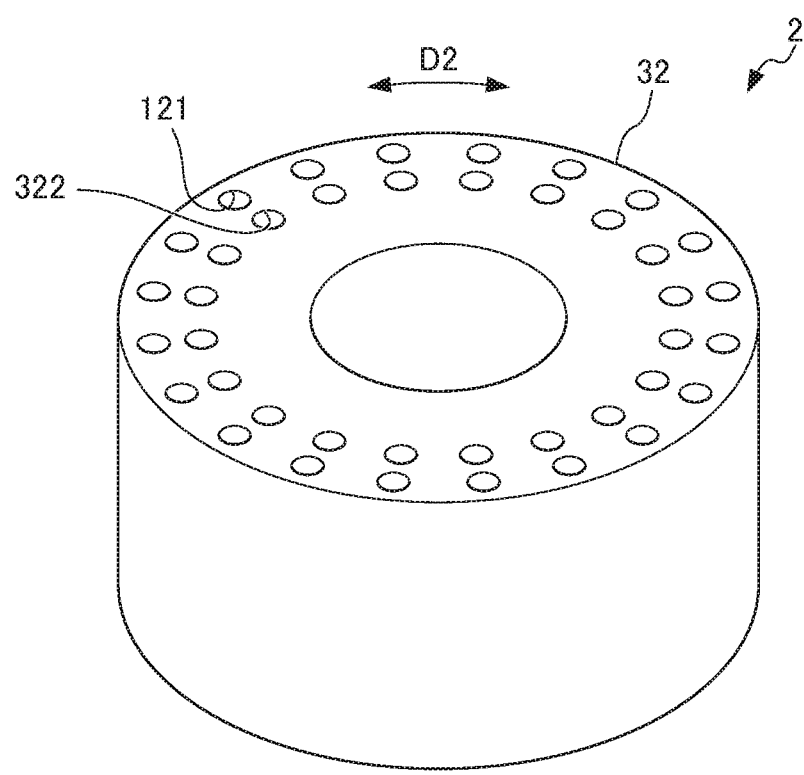
FIG. 7 is a perspective view showing, in outline, the configuration of a rotor core in a motor according to a different embodiment.

FIG. 7 is a perspective view showing, in outline, the configuration of a rotor core 32 in the motor 2 according to the different embodiment as a modification. The motor 2 of this embodiment differs from the motor 1 in that the motor 2 includes a rotor core 32 with a second slot 322 instead of the rotor core 12 with the second slot 122, etc.

The rotor core 32 in the motor 2 includes multiple first slots 121 and multiple second slots 322.

The second slots 322 are formed as through holes penetrating the rotor core 32 in the axis direction D1. More specifically, the second slots 322 are formed as through holes penetrating the rotor core 32 in the axis direction D1 from one end surface of the rotor core 32 toward an opposite end surface thereof. The second slots 322 have sectional areas substantially equal to each other and equal to the sectional areas of the first slots 121. The multiple second slots 322 are arranged at intervals in the peripheral direction D2 of the rotor core 32.

The second slots 322 are formed on an inner side with respect to the first slots 121. In other words, the multiple second slots 322 are arranged along the virtual circle R2 centered at the axis center CL of the rotary shaft 11 (rotation center of the rotor core 32) and having a shorter diameter than the virtual circle R1 along which the first slots 121 are arranged. The second slots 322 are arranged at substantially regular intervals along the virtual circle R2. In this embodiment, the first slots 121 and the second slots 322 are arranged at the same positions in terms of phase in the peripheral direction of the rotor core 32. More specifically, the second slot 322 (preferably, the center Q2 of the second slot 322) is arranged on the line segment M connecting the center Q1 of a first slot 121 and the axis center CL of the rotary shaft 11.

The present invention is not limited to the foregoing embodiments but can be changed or modified in various ways. For example, in the embodiment shown in FIG. 1, the multiple second conductor bars 132 are each arranged on the bisector N of an angle formed by the line segment M connecting the center of a first conductor bar 131 (the center Q1 of a first slot 121) and the axis center CL of the rotary shaft 11 and a line segment M adjacent to the former line segment M in the peripheral direction D2. However, this is not the only case.

In the embodiment shown in FIG. 1, the multiple second slots 122 have sectional areas smaller than the sectional areas of the first slots 121. However, this is not the only case. Specifically, the multiple second slots 122 may have sectional areas equal to or larger than the sectional areas of the first slots 121.

As long as the rotor core is fixed to an outer peripheral side of the rotary shaft, the rotor core and the rotary shaft may be fixed in any way. As long as the end rings are arranged adjacent to the opposite end surfaces of the rotor core, the positions of the end rings and those of the end surfaces of the rotor core relative to each other may be determined in any way.

EXPLANATION OF REFERENCE NUMERALS 1, 2 Motor
10 Rotor
11 Rotary shaft
12, 32 Rotor core
13 Secondary conductor
20 Stator
121 First slot
122, 322 Second slot
131 First conductor bar (conductor bar)
132 Second conductor bar (conductor bar)
133 End ring
CL Axis center
D1 Axis direction
D2 Peripheral direction
D3 Radially outward direction
M Line segment
N Bisector of angle
Q1, Q2 Center
F Centrifugal force
T Moment

What is claimed is:

1. A rotor comprising:
a cylindrical rotor core fixed to an outer peripheral side of a rotary shaft rotatable about an axis center, the rotor core including:
multiple first slots arranged at substantially regular intervals in a peripheral direction of the rotor core and penetrating the rotor core in an axis direction of the rotary shaft; and
multiple second slots formed at an inner position of the rotor core with respect to the first slots, arranged at substantially regular intervals in the peripheral direction of the rotor core, and penetrating the rotor core in the axis direction of the rotary shaft, wherein
each of the first slots and each of the second slots are positioned at different positions in terms of phases in the peripheral direction of the rotor core such that for each second slot, in a front view, a straight line from the axis center through the center of the second slot and extending in a radially outward direction to the outside of the cylindrical rotor core does not intersect any of the first slots; and
a secondary conductor including:
multiple conductor bars arranged in the first slots and the second slots; and
a pair of ring-like end rings arranged at opposite end surfaces of the rotor core and connecting end portions of the multiple conductor bars.

2. The rotor according to claim 1, wherein the multiple first slots are arranged at substantially regular intervals and have substantially equal sectional areas, and
the multiple second slots are arranged at substantially regular intervals and have substantially equal sectional areas.

3. A motor comprising:
the rotor according to claim 1; and
a circular cylindrical stator in which the rotor is arranged.

4. The rotor according to claim 1, wherein each of the first slots is positioned, in terms of phase, at half of a pitch between two adjacent second slots in the peripheral direction of the rotor core.

* * * * *